United States Patent Office 3,452,073
Patented June 24, 1969

3,452,073
LIQUID POLYISOCYANATE COMPOSITIONS AND PROCESS FOR THE PRODUCTION THEREOF
Andrew Shultz, Williamsville, N.Y., assignor to Allied Chemical Corporation, New York, N.Y., a corporation of New York
No Drawing. Filed Apr. 5, 1965, Ser. No. 445,715
Int. Cl. C07c *119/04;* C08 *17/00*
U.S. Cl. 260—453                                    6 Claims Liquid isocyanate compositions useful in the manufacture of polyurethanes are prepared by heating a degassed and essentially solvent-free tolylene-diamine phosgenation mixture at a temperature in the range of 140°–200° C. for 2–25 hours and distilling from the resulting mixture a monomeric tolylene diisocyanate fraction equal to about 3 to 30% by weight and recovering the distill and as the desired composition.

---

It has already been proposed to polymerize isocyanates, especially with the production of the dimeric uretedione forms by subjecting isocyanates to the action of various catalysts, for example in the presence of pyridine, substituted pyridines, trialkyl phosphines and the like. It has also been proposed to polymerize isocyanates, particularly with the production of trimeric, isocyanurate forms by contacting monoisocyanates and diisocyanates with an even greater variety of catalysts, such as alkali earth metal alkoxides, tertiary amines, transition metal halides and the like. In these catalytic processes, the dimerization, as well as the trimerization reactions occur exothermally and continue until the bulk of the isocyanate has been consumed. Products derived from such processes, containing so-called masked isocyanate groupings which revert to reactive isocyanate groups on heating have a limited use in the manufacture of specialized urethane foams where high polymerization and high foaming temperatures are required. In the manufacture of rigid and of flexible urethane foams for most applications, it is desirable to interact a relatively non-volatile, toluene dissocyanate derived polyisocyanate composition having a viscosity range of about 30 to 1000 and preferably in the range of about 50–250 cps. at 26° C. and having an isocyanate content of 33 to 43 and preferably 37–41 weight percent, with a high molecular weight polyol in the presence of a catalyst such as stannous octoate and a blowing agent such as trichlorofluoromethane in what is currently known in the art as a one-shot foaming process as compared to the time consuming and less economical two-step prepolymer process. For such one-shot foam applications, polymeric isocyanates consisting mainly of isocyanate dimers, otherwise known as uretediones and polymeric isocyanate compositions consisting mainly of trimeric isocyanates, otherwise known as isocyanurates, are not suitable due to the slow rate at which the so-called masked isocyanate groups revert to the active isocyanate form and due to the difficulties encountered in incorporating these high-melting and insoluble dimer- and trimer-containing polyisocyanates into liquid formulations suitable for the manufacture of urethane foams, in industrial foaming apparatus.

It is therefore an object of this invention to prepare liquid polyisocyanate compositions suitable for the manufacture of urethane polymers. It is another object of this invention to provide a process for preparing storable liquid polyisocyanate compositions especially suitable for the manufacture of urethane foams by a one-shot foaming process.

Another object is to devise novel liquid toluene diamine phosgenation product compositions suitable for use in the one-shot process for the manufacture of cellular urethanes.

These and still further objects of the present invention will become readily apparent from the following description thereof.

It has now been discovered that polyisocyanate compositions, and especially liquid polyisocyanates compositions particularly suitable for the manufacture of urethane polymers by the one-shot foaming process, can be prepared by subjecting a degassed and solvent free toluenediamine phosgenation mixture to a thermal treatment, whereby the degassed phosgenation mixture essentially devoid of solvents is heated at temperatures sufficient to cause conversion in a reasonable duration of time, of at least a fraction of the tolylene diisocynate present in the phosgenation mixture to liquid polymeric isocyanate compositions useful in the manufacture of urethane foam polymers by the one-shot foaming process. In particular it has been discovered that submitting an undistilled toluene diamine phosgenation product which has been degassed and stripped of solvent to heating periods of 2 to 25 hrs. at temperatures of 140 to 200° C. under an applied pressure of 100 to about 760 mm. of Hg causes conversion of the undistilled toluenediamine phosgenation product to liquid polyisocynate compositions of increased viscosity and reduced isocyanate content particularly suitable for the manufacture of urethane polymers by the one-shot foaming process.

In the actual performance of the process of the present invention it has been discovered that heating intervals of 16 to 18 hrs. at temperatures of 150 to 160° C. and at an applied pressure of about 760 mm. Hg. are particularly suitable for the successful operation of the process. At heating temperatures below about 140° C., the heating cycles are inordinately lengthened thereby allowing the occurrence of condensations which lead to the separation from the liquid polyisocyanate compositions of solid particles which catalyze the production of additional solid particles on storage thereby necessitating subsequent treatment of the polyisocyanate compositions immediately prior to use. Such treatment is undesirable and uneconomic; it may involve filtration, decantation or rephosgenation to remove the solid deposits. At heating temperatures in excess of 200° C., for example at about 230° C., violent explosions occur causing damage even to steel reactors and creating hazards to the operators of the process equipment. At temperatures in excess of 200° C., it is probable that initially some of the isocyanate groups are converted with the loss of the elements of carbon dioxide to carbodiimides which are known to catalyze the conversion of isocyanates to carbodiimides so that at temperatures in excess of 200° C. an autocatalytic process may develop rapidly, resulting in the production of substantial amounts of carbodiimides accompanied by the generation of carbon dioxide in quantities sufficient to cause violent rupture of the reactors and create extremely hazardous conditions for the operators of the process equipment.

While we are not certain of the nature of the transformations which occur in the undistilled toluenediamine phosgenation mixtures during the process of this invention, it appears possible that the liquid polyisocyanate compositions of this invention are formed through the condensation of tolylene disocyanates which constitute the major portion of the phosgenation mass with certain impurities which may be present in it. Such impurities may be in the form of ureas obtained by condensation, during the phosgenation process, of a carbamoyl chloride group with an amine group. Such impurities may also occur in the form of benzimidazolones resulting from the phosgenation of orthodiamine impurities present in the predominantly meta toluenediamine mixture being phosgenated.

While these and other impurties may be identified in the crude phosgenation mixtures and may interact with each other or with isocyanate groups to form the complex liquid polyisocyanate compositions of the present invention, and while more elaborate explanations may be brought forth to explain the formation of the liquid polyisocyanate compositions of the present invention, we do not wish to rely on or be limited by these explanations in the performance of the process of our invention.

The polyisocyanate compositions of the present invention may be isolated in the form of residues having a viscosity range in excess of 1000 cps. at 26° C. by removing a substantial amount of the unreacted monomeric tolylene diisocyanate from the treated phosgenation mixture. In the manufacture of urethane polymers by the one-shot foaming process it is preferred to employ isocyanate mixture having a viscosity range of 50–250 c.p.s. at 26° C., so that in carrying out the process of the present invention it is preferred to remove only a portion of the unreacted monomeric tolylene diisocyanate such that a polyisocyanate composition is obtained in the form of a mobile liquid especially suitable in the manufacture of urethane foams and having a viscosity range, generally from 30 to 1000 cps. and preferably from 50 to 250 cps. at 26° C. and an isocyanate content of about 33–43 and preferably 37–41 percent by weight. After the heating process, a portion of the unreacted monomeric tolylene diisocyanate equal to 3 to 30 percent by weight of the total weight of the reaction mixture may be removed by distillation, for example at a temperature of about 120 to 130° C. and an applied pressure of 5 to 10 mm., in order to obtain in the form of a residue of polyisocyanate composition having the preferred viscosity range and isocyanate content mentioned previously.

Phosgenation mixtures for use in the preparation of the liquid polyisocyanate compositions of this invention may be prepared by phosgenation of commercial mixtures of metatoluenediamines containing up to 3 or 4 percent by weight of ortho isomers under known phosgenation conditions for example such as described in U.S.P. 2,642,499 or U.S.P. 2,680,127. The degassing and solvent stripping operations may equally be conducted by well-known degassing and solvent stripping operations for example such as described in U.S.P. 2,680,129 and U.S.P. 2,680,130. The distillation of a portion equal to 3 to 30 percent by weight of the unreacted tolylene diisocyanate, subsequent to the thermal treatment according to the process of this invention may be similarly carried out under distillation conditions generally used for distilling tolylene diisocyanate provided that the distillations are performed such that the occurence of further chemical transformation and the interaction of the constituents of the reaction mixture is reduced to a minimum.

The process in accordance with this invention will be readily understood by reference to the following specific examples which are given by way of illustration and not for the purpose of limiting the process of this invention and the products thereof.

EXAMPLE 1

For the preparation of the toluenediamine phosgenation mixture of the present invention, a solution of commercial toluenediamines in ortho dichlorobenzene, corresponding to a concentration of 10 percent by weight of toluenediamines, is added to a solution of phosgene in ortho dichlorobenzene corresponding to a phosgene concentration of 25 percent by weight and to a molar ratio of phosgene to toluene diamine of about 4 to 1 at such a rate that the reaction temperature does not exceed 20° C. The reaction mixture is then heated in a period of 3¼ to 4 hours to a final temperature of about 175° C. while phosgene is continuously bubbled in until the evolution of hydrogen chloride gas ceases. The phosgenation mixture is then degassed by a rapid stream of dry nitrogen and the solvent is removed by vacuum distillation at an applied pressure of about 40 mm. and a temperature of about 120–140° C.

A portion, 2450 grams, of the degassed and essentially solvent free phosgenation mixture, prepared as indicated above, is heated for 17 hrs. at a temperature of 150–160° C. and at an applied pressure of 760 mm. during which the viscosity of the phosgenation mass, measured at 26° C. increases gradually from about 12 cps. to about 86 cps. The reaction mixture is then cooled to a temperature of about 120° C. and fractionally distilled under an applied pressure of 5 mm., in order to remove as monomeric tolylene diisocyanate a fraction weighing 94 g. and corresponding to 3.8 percent by weight of the total reaction product. The remaining undistilled portion amounts to 2346 g. and has a viscosity of 89 cps. measured at 26° C. and an isocyanate content corresponding to 38.7 percent by weight.

The following additional examples of the process of the present invention were performed in a manner analogous to that described in Example 1 above.

| Example No. | Phosgenation mass charged in grams | Heating temperature in ° C. | Heating time in hours | Pressure, mm. Hg. | Recovered tolylene diisocyanate in grams | Polyisocyanate product in grams | Percent NCO | Viscosity in cp.s at 26° C. |
|---|---|---|---|---|---|---|---|---|
| 2 | 2,500 | 150–160 | 17 | 760 | 625 | 1,800 | 36.2 | 680 |
| 3 | 1,350 | 150–160 | 17 | 760 | 360 | 888 | 38.2 | 54 |
| 4 | 17,500 | 150–160 | 17 | 760 | 4,426 | 12,060 | 38.0 | 198 |

Whenever, in the above description and examples of this invention, the term "an applied pressure" is employed, it is intended to designate "an absolute pressure in mm. Hg," for example "an applied pressure of 760 mm." signifies "an absolute pressure of 760 mm. Hg."

I claim:

1. A liquid polyisocyanate composition having a viscosity in the range of 30–1000 cps. at 26° C. and an isocyanate content of 33–43%, by weight, produced by heating a degassed and essentially solvent-free toluenediamine phosgenation mixture to a temperature in the range of 140 to 200° C., maintaining said mixture at said heating temperature for 2 to 25 hours, distilling from said mixture a monomeric tolylene diisocyanate fraction equal to about 3 to 30 percent by weight of said mixture having the undistilled fraction as the liquid polyisocyanate composition.

2. A liquid polyisocyanate composition having a viscosity in the range of 50–250 cps. at 26° C. and an isocyanate content of 37–41%, by weight, produced by heating a degassed and essentially solvent-free toluenediamine phosgenation mixture to a temperature in the range of 150 to 160° C., maintaining said mixture at said heating temperature for 16 to 18 hours, distilling from said mixture a monomeric tolylene diisocyanate fraction equal to about 25 to 30 percent by weight of said mixture leaving the undistilled fraction as the liquid polyisocyanate composition.

3. A process for the production of a liquid polyisocyanate composition having a viscosity in the range of 30 to 1000 cps. at 26° C. and an isocyanate content of 33 to 43 percent by weight, which comprises heating a degassed and essentially solvent-free toluene-diamine phosgenation mixture to a temperature in the range of 140 to 200° C., maintaining said mixture at said heating temperature for 2 to 25 hrs., distilling from said mixture a monomeric tolylene diisocyanate fraction equal to about 3 to 30 percent by weight of said mixture leaving the undistilled fraction as the liquid polyisocyanate composition.

4. The process of claim 3 wherein the heating is carried out under an applied pressure of 100 to about 760 mm. of Hg.

5. A process for the production of a liquid polyisocyanate composition having a viscosity in the range of 50 to 250 cps. at 26° C. and an isocyanate content of 37 to 41 percent by weight, which comprises heating a degassed and essentially solvent-free toluenediamine phosgenation mixture to a temperature in the range of about 150 to 160° C., maintaining said mixture at said temperature for about 16 to 18 hrs., distilling from said mixture a monomeric tolylene diisocyanate fraction equal to about 25 to 30 percent by weight of said mixture leaving the undistilled fraction as the liquid polyisocyanate compositions.

6. Process of claim 5 wherein the heating is carried out under an applied pressure of 100 to about 760 mm. of Hg.

References Cited

UNITED STATES PATENTS

| 2,706,169 | 4/1955 | Beck | 260—453 X |
| 3,140,305 | 7/1964 | Lowenstein | 260—453 |
| 3,180,852 | 4/1965 | Pfirschke et al. | 260—453 X |
| 3,215,652 | 11/1965 | Kaplan | 260—453 X |
| 3,246,035 | 4/1966 | Forman et al. | 260—453 X |
| 3,317,481 | 5/1967 | Youker | 260—453 X |

CHARLES B. PARKER, *Primary Examiner.*

D. H. TORRENCE, *Assistant Examiner.*

U.S. Cl. X.R.

260—2.5, 239, 248, 309.2, 551

UNITED STATES PATENT OFFICE
CERTIFICATE OF CORRECTION

PO-1050
(5/69)

Patent No. 3,452,073             Dated June 24, 1969

Inventor(s) Andrew Shultz

It is certified that error appears in the above-identified patent and that said Letters Patent are hereby corrected as shown below:

Column 1, lines 17 and 18, "distill and" should read
-- distilland --
Column 2, line 5, "polyisocyanates" should read
-- polyisocyanate --
line 13, "diisocynate" should read
-- diisocyanate --
line 23, "polyisocynate" should read
-- polyisocyanate --
Column 3, line 15 "c.p.s." should read -- cps. --
Column 4, in the table, last heading to right "cp.s" should
read -- cps. --
Column 3, line 46 "2,642,499" should read -- 2,642,449 --
Column 4, line 49 "having" should read -- leaving --
line 67 "toluene-diamine" should read
-- toluenediamine --

SIGNED AND
SEALED
APR 7 1970

(SEAL)
Attest:

Edward M. Fletcher, Jr.
Attesting Officer

WILLIAM E. SCHUYLER, JR.
Commissioner of Patents